US006216216B1

(12) United States Patent
Bonola

(10) Patent No.: US 6,216,216 B1
(45) Date of Patent: Apr. 10, 2001

(54) METHOD AND APPARATUS FOR PROVIDING PROCESSOR PARTITIONING ON A MULTIPROCESSOR MACHINE

(75) Inventor: Thomas J. Bonola, Tomball, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/167,768

(22) Filed: Oct. 7, 1998

(51) Int. Cl.[7] .................................................. G06F 15/16
(52) U.S. Cl. .................................................. 712/28; 710/8
(58) Field of Search .................... 712/28; 710/8

(56) References Cited

U.S. PATENT DOCUMENTS

| | | | |
|---|---|---|---|
| 3,643,227 | * 2/1972 | Smith et al. | 709/105 |
| 4,130,865 | * 12/1978 | Heart et al. | 709/201 |
| 4,181,936 | * 1/1980 | Kober | 709/212 |
| 4,333,144 | * 6/1982 | Whiteside et al. | 709/102 |
| 4,394,727 | * 7/1983 | Hoffman | 709/103 |
| 4,942,525 | * 7/1990 | Shintani et al. | 712/217 |
| 5,434,987 | * 7/1995 | Abramson et al. | 712/226 |
| 5,699,537 | * 12/1997 | Sharangpani et al. | 712/217 |
| 5,857,109 | * 1/1999 | Taylor | 712/37 |

OTHER PUBLICATIONS

Mendel, Brett; "Server I/O all set to flow"; *Lantimes*, Oct. 27, 1997, vol. 14, Issue 22; cover page and p. 31.
Briggs, Chris; "Smarter and Faster I/O for Servers"; CORE: Operating Systems; *Byte*, May 1, 1996, vol. 2, No. 5.
Thompson, Tom; "I2O Beats I/O Bottlenecks"; *Byte*, Aug. 1997, pp. 85, 86 and 3 additional pages.

I2O Introduction; Technology Backgrounder; Aug. 13, 1997; http://www.i2osig.org/Architecture/TechBack.html.
i960®RP I/O Processor—the I2O SIG site; http://134.134.214.1/design/iio/i2osig.html; Feb. 6, 1998.
"Welcome to the I2O SIG® Web Site!"; http://www.i2osig.org; Feb. 6, 1998.
"About I2O Technology"; http://www.i2osig.org/Architecture; Feb. 6, 1998.
"Technology Backgrounder"; http://www.i2osig.org/Architecture/TechBack.html; Feb. 6, 1998; 6 pages.
"Questions and Answers"; http://www.i2osig.org/Architecture/QandA.html; Feb. 6, 1998; 4 pages.
"I2O® Specifications For Non–Members"; http://www.i2osig.org/Architecture/GetSpec.html; Feb. 6, 1998.
Amdahl, Carlton G.; "I2O Future Directions"; http://www.i2osig.org; Jun. 1996; 12 pages.
Goble, Scott, et al.; "Intelligent I/O Architecture"; http://www.i2osig.org; Jun. 1996; 22 pages.
"Press Releases and Clips"; http://www.i2osig.org/Press; Feb. 6, 1998; 4 pages.

(List continued on next page.)

*Primary Examiner*—David Y. Eng
(74) *Attorney, Agent, or Firm*—Fletcher, Yoder & Van Someren

(57) ABSTRACT

In a multiprocessor computer system, a method and apparatus for partitioning the processors therein. The host processors are partitioned, leaving at least one host processor for providing operating system functions, and allocating one or more target processors to perform other functions such as those of a typical IOP. The processors are first allocated and then totally controlled by placing the allocated processors under the control of an application-specific software rather than leaving them under the direct control of the operating system.

18 Claims, 7 Drawing Sheets

OTHER PUBLICATIONS

Listing of Press Releases; http://altavista.digital.com/cgi-bin/quer . . . =21%2FMar%2F86&d1=&search.x=46&search.y=6; Feb. 6, 1998; 2 pages.

Crothers, Brooke; "Intel server chip gets big backing", Oct. 7, 1997; http://www.news.com/News/Item/0,4,14962,00.html; Feb. 6, 1998.

"HP Demonstrates Commitment to I2O Standard With New I2O Disk–array Controller"; Hewlett Packard; Press Release, Atlanta, Oct. 8, 1997; http://hpcc920.external.hp.com/pressrel/oct97/08oct97b.html; Feb. 6, 1998; 2 pages.

"I2O: Disaster in the making for the freeware community"; http://22.kenandted.com/i2o/disaster.html; Feb. 6, 1998; 2 pages.

* cited by examiner

METHOD AND APPARATUS FOR PROVIDING PROCESSOR PARTITIONING ON A MULTIPROCESSOR MACHINE

FIELD OF THE INVENTION

The present invention relates to computer systems, and more particularly, but not by way of limitation, to a method and apparatus for providing processor partitioning on a multiprocessor machine.

BACKGROUND OF THE INVENTION

One of the key factors in the performance of a computer system is the speed at which the central processing unit (CPU) operates. Generally, the faster the CPU operates, the faster the computer system can complete a designated task. Another method of increasing the speed of a computer system is through the use of multiple CPUs. This is commonly known as multiprocessing. With multiple CPUs, algorithms required to complete a task can be executed substantially in parallel as opposed to their sequential execution, thereby decreasing the total time to complete the task.

However, as CPUs are dependent upon peripherals for providing data to the CPU and storing the processed data from the CPU, when a CPU needs to read or write to a peripheral, the CPU is diverted from a current algorithm to execute the read/write transaction. The length of time that the CPU is diverted is typically dependent upon the speed of the I/O transaction.

One advancement developed to increase the efficiency of I/O transactions is the intelligent input/output ($I_2O$) architecture. In the $I_2O$ approach to I/O, low-level interrupts are off-loaded from a CPU to I/O processors (IOPs). The IOPs are additional processors that specifically handle I/O. With support for message-passing between multiple independent processors, the $I_2O$ architecture relieves the host processor of interrupt-intensive I/O tasks, greatly improving I/O performance especially in high-bandwidth applications such as networked video, groupware, and client/server processing.

Typical $I_2O$ architectures use a "split driver" model which inserts a messaging layer between the portion of the device driver specific to the operating system and the portion of the device driver specific to the peripheral. The messaging layer splits the single device driver of today into two separate modules, an Operating System Service Module (OSM), and a Downloadable Driver Module (DDM). The only interaction one module has with another module is through this messaging layer.

The OSM comprises the portion of the device driver which is specific to the operating system. The OSM interfaces with the operating system of the computer system (which is commonly referred to in the art as the "host operating system") and is executed by the CPU. Typically, a single OSM may be used to service a specific class of peripherals. For example, one OSM would be used to service all block storage devices, such as hard disk drives, and CD-ROM drives.

The DDM provides the peripheral-specific portion of the device driver that understands how to interface to the particular peripheral hardware. To execute the DDM, an IOP is added to the computer system. A single IOP may be associated with multiple peripherals, each controlled by a particular DDM, and contains its own operating system such as, for example, the $I_2O$ Real-Time Operating System (iRTOS). The DDM directly controls the peripheral, and is executed by the IOP under the management of the iRTOS.

In general operation, the communications model used in the $I_2O$ architecture is a message passing system. When the CPU seeks to read or write to a peripheral in an $I_2O$ system, the host operating system makes what is known as a "request". The OSM translates the request by the host operating system and, in turn, generates a message. The OSM sends the message across the messaging layer to the DDM associated with the peripheral which processes it appropriately to achieve a result. Upon completion of the processing, the DDM sends the result back to the OSM by sending a message through the messaging layer. To the host operating system, the OSM appears just like any other device driver.

By executing the DDM on the IOP, the time-consuming portion of transferring information from and to the peripheral hardware is off-loaded from the CPU to the IOP. With this off-loading, the CPU is no longer diverted for inordinate amounts of time during an I/O transaction. Moreover, because the IOP is a hardware component essentially dedicated to the processing of the I/O transactions, the problem of I/O bottlenecking is mitigated. Accordingly, any performance gains to be achieved by adding an additional or faster CPU to the computer system may be unhindered by the I/O processing bottleneck.

There are three common approaches to implement the $I_2O$ architecture. The first is an IOP installed on the motherboard of the computer system. In this approach, the IOP is installed directly on the motherboard and is used for $I_2O$ processing. In this particular configuration, the IOP is often used as a standard PCI bridge, and can also be used to bring intelligence to the PCI bus.

The second approach is to include an IOP on adapter cards, such that with an IOP on an adapter card, IT managers can add intelligent I/O to the computer system by adding an additional adapter.

The third approach is to install the IOP in the computer system via an optional plug-in card. This allows systems to be populated with one IOP per host adapter plugged into a slot instead of on the motherboard.

Although the intent of $I_2O$ was the implementation of portable, high-performance intelligent I/O systems, several problems remain with the $I_2O$ architecture. As is often the case, one problem is cost. The inclusion or the addition of additional hardware and extra processors (the IOPs) to a computer system will ultimately raise the price of the system.

Another problem arises as a result of the direction the computer industry has taken in the adoption of an IOP "standard". Currently, the computer industry is pushing to adopt the Intel i960 processor for the industry standard $I_2O$ IOP. Some of the problems with the i960 include computing and speed problems, especially when the i960 is compared to other existing processors on the market.

Therefore, while $I_2O$ is a significant improvement in increasing the overall speed of computer systems, an efficient implementation of $I_2O$ is necessary to realize maximum gains. The present invention utilizes software to partition the multiple processors so that at least one of the host processors is dedicated to controlling I/O. The present invention further makes a computer system $I_2O$ compliant by providing a special software driver to perform the allocation and control of host processors for functions such as those controlled by a typical IOP.

SUMMARY OF THE INVENTION

The present invention overcomes the above identified problems as well as other shortcomings and deficiencies of existing technologies by providing a method and apparatus for partitioning processors on a multiprocessor machine. The present invention performs the partitioning using a software driver. The host processors are partitioned, leaving at least one host processor for providing operating system functions, and allocating one or more target processors to perform other functions such as those of a typical IOP. The present invention allocates and totally controls processors, placing the target processors under the control of application-specific software instead of leaving them under the direct control of the operating system.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

With reference to FIGS. 1, 2, 3, 4, 5, 6 and 7, there are shown block diagrams illustrating an exemplary embodiment of the present invention. The purpose of these block diagrams is to illustrate, among other things, the features of the present invention and the basic principles of operation thereof. These block diagrams are not necessarily intended to schematically represent particular modules of circuitry or control paths.

Figure 1:
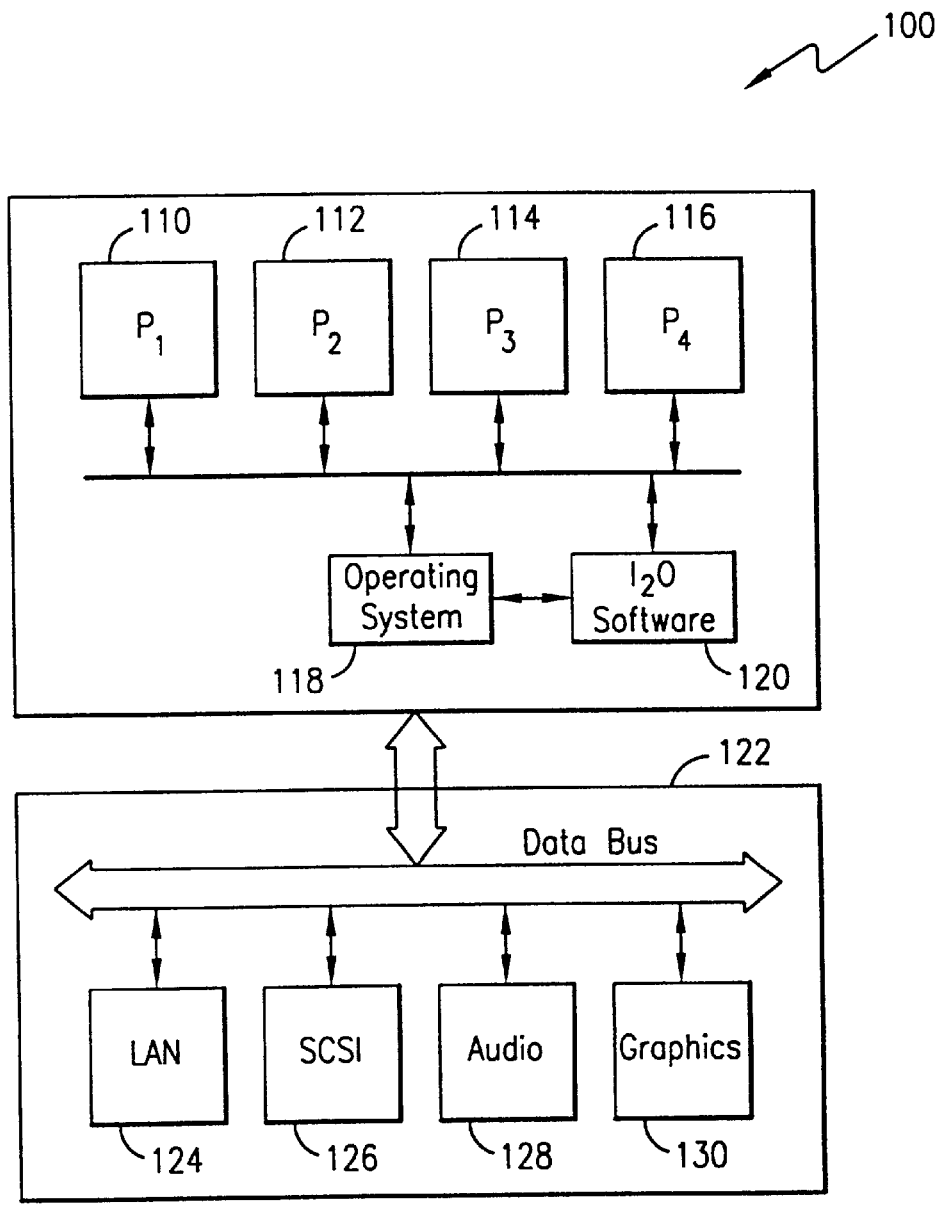
FIG. 1 is a schematic block diagram of a computer system utilizing the present invention.

Referring now to FIG. 1, there is illustrated a schematic block diagram of a computer system 100. As illustrated, computer system 100 is a multiprocessor system and contains the following: multiple host processors 110, 112, 114 and 116; module 118 which contains the operating system; module 120 which contains $I_2O$ software; and associated hardware 122. As depicted, the associated hardware 122 includes items such as a LAN controller 124, SCSI controller 126, audio controller 128, and graphics controller 130, each being connected by a data bus.

As computer system 100 is a multiprocessing computer, it is able to execute multiple threads simultaneously, one for each of the processors therein. Further it is contemplated that the processors in computer system 100 can operate asymmetrically, symmetrically, or both asymmetrically and symmetrically.

Although the present invention is illustrated in a computer system having four host processors, it is contemplated that the present invention could also be utilized in any multiprocessor computer system with at least two host processors. The present invention partitions the host processors into two groups: one or more processors will be used to perform operating system functions, and one or more target processors will be allocated to perform non-system functions, such as serving as an IOP. The processors left under the control of the operating system will communicate with the target processors that are not under the control of the operating system.

In this particular embodiment of computer system 100, the $I_2O$ software of module 120 is utilized to dedicate one or more of the processors (such as processor 116) for use as a input/output processor (IOP) such that computer system 100 is an $I_2O$ compliant computer system.

Figure 2:
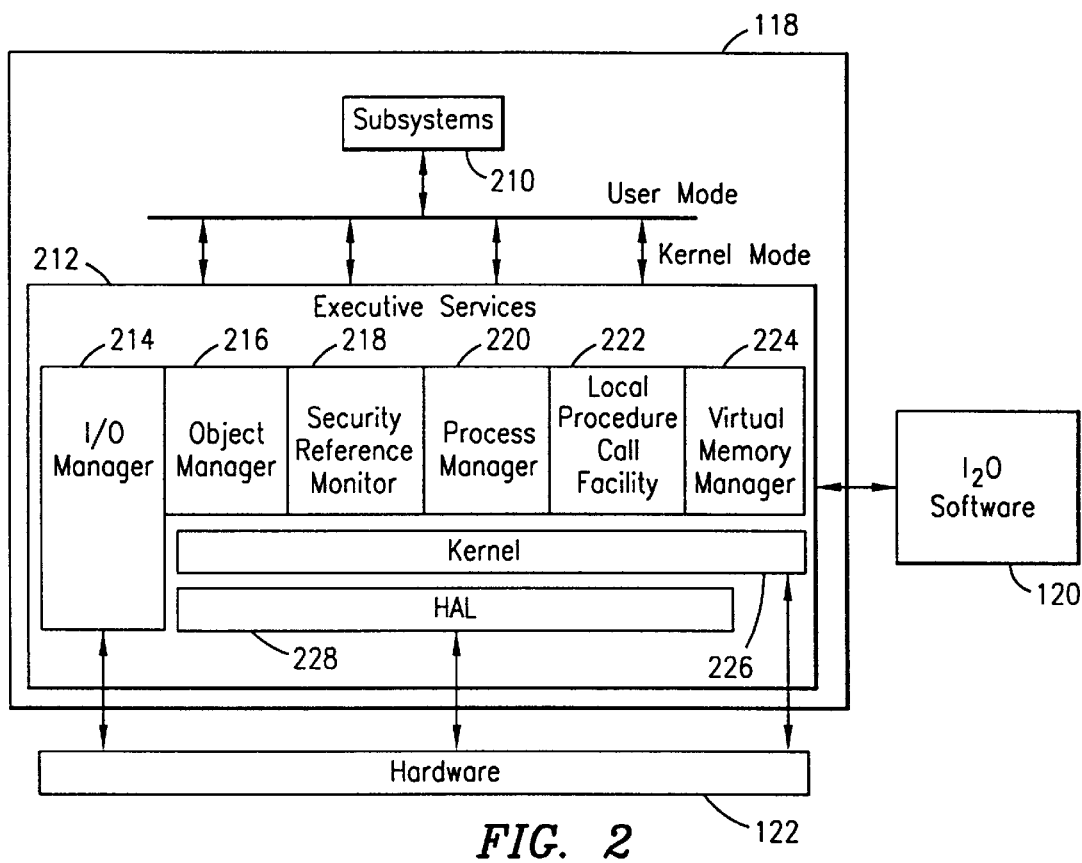
FIG. 2 is a schematic block diagram of an exemplary embodiment of an operating system in accordance with the principles of the present invention.

FIG. 2 illustrates a more detailed block diagram of an exemplary architecture for operating system 118. As depicted, the architecture of operating system 118 is a kernel based operating system. Operating system 118 includes subsystems 210 (which operate in user mode), and system or executive services 212 (which operate in kernel mode). Executive services 212 are made up of multiple components, such as the I/O manager 214, the object manager 216, the security reference monitor 218, the process manager 220, the local procedure call facility 222, the virtual memory manager 224, the kernel 226, and the hardware abstraction layer (HAL) 228. The components that make up the executive services provide basic operating system services to subsystems 210 and to each other. The components are generally completely independent of one another and communicate through controlled interfaces.

Still referring to FIG. 2, the I/O manager 214 manages all input and output for the operating system including the managing of the communications between drivers of computer system 100. Object manager 216 creates, manages, and deletes executive objects. Security reference monitor 218 ensures proper authorization before allowing access to system resources such as memory, I/O devices, files and directories. Process manager 220 manages the creation and deletion of processes by providing a standard set of services for creating and using threads and processes in the context of a particular subsystem environment. Local procedure call facility 222 is a message-passing mechanism for controlling communication between the client and server when they are on the same machine. Virtual memory manager 224 maps virtual addresses in the process' address space to physical pages in the computer's memory.

Still referring to FIG. 2, kernel 226 is the core of the architecture of operating system 118 and manages the most basic of the operating system functions. It is responsible for thread dispatching, multiprocessor synchronization, and hardware exception handling.

Still referring to FIG. 2, in this particular embodiment applications utilized in computer system 100 are kept separate from the operating system 118 itself. Operating system 118 runs in a privileged processor mode known as kernel mode and has access to system data and hardware. Applications run in a nonprivileged processor mode known as user mode and have limited access to system data and hardware through a set of tightly controlled application programming interfaces (APIs) or entrypoints.

In this exemplary embodiment, good results have also been achieved in the present invention by using a microkernel-based operating system for operating system 118. In a microkernel-based operating system, only the functions that cannot be reasonably performed elsewhere remain in the kernel. The functionalities that are removed from the standard kernel are put in subsystems 210. Subsystems 210 provide the traditional operating system support to applications through a set of APIs.

Hardware abstraction layer (HAL) 228 is an isolation layer of software that hides, or abstracts hardware differences from higher layers of the operating system. Through the utilization of HAL 228, the different types of hardware all "look" alike to the operating system. The HAL 228 removes the need to specifically tailor the operating system to the hardware with which it communicates. Routines of HAL 228 can be called from both the base operating system (including the kernel) and from the device drivers.

The present invention provides a method and apparatus for partitioning the host processors 110–116 of a multiprocessor system into two groups. The invention allocates one or more host processors to perform non-system functions such as serving as an IOP, leaving at least one processor to perform operating system functions and to communicate with the processors that are not under the control of the operating system. The invention loads application-specific code onto the allocated processors (hereinafter called "target processors") to work in conjunction with the processors under the control of the operating system (hereinafter called the "operating system processors").

In our preferred embodiment, the I$_2$O software of module 120 is utilized to dedicate one or more of the processors (such as processor 116) for use as an I/O processor (IOP) such that computer system 100 is an I$_2$O compliant computer system. In the preferred embodiment, the invention takes the form of a kernel mode driver running under Windows NT, but it is contemplated that the software driver may instead run in user mode or in HAL mode. Depending on the targeted application, this driver must be loaded before any other system driver for which it will provide services.

Figure 3:
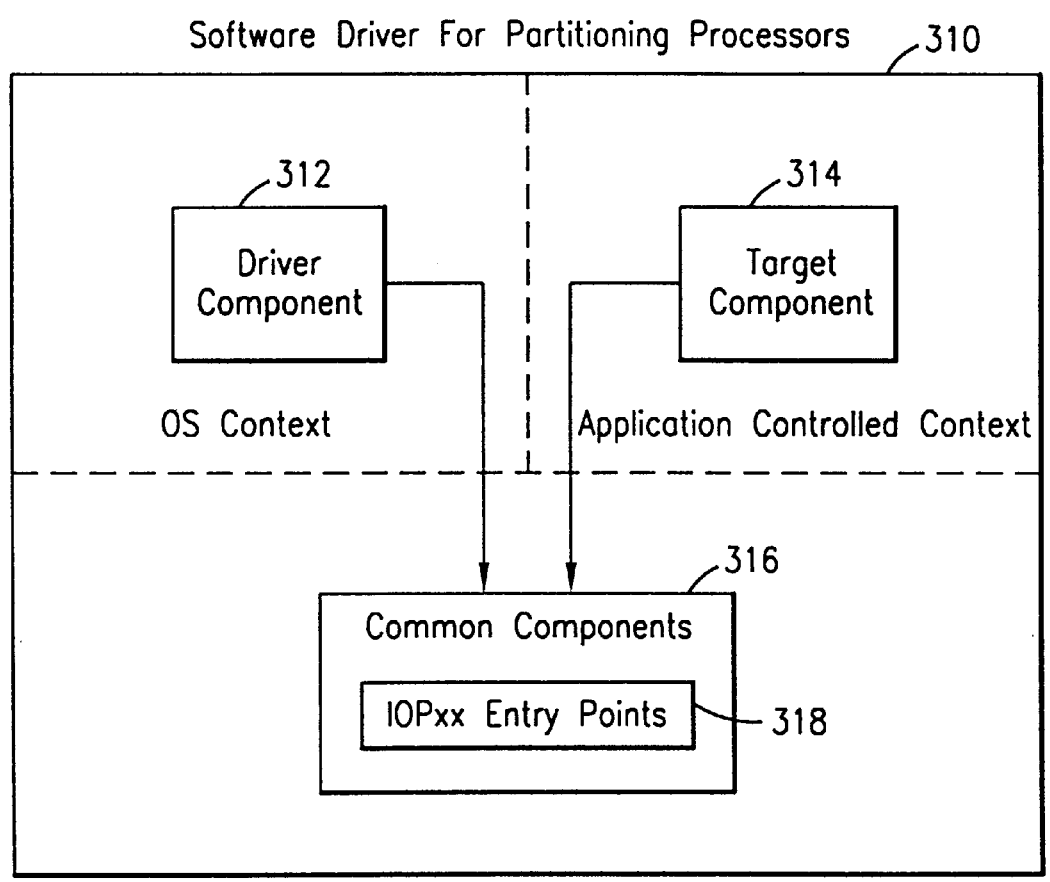
FIG. 3 is a schematic block diagram of the software driver used to implement processor partitioning.

Referring now to FIG. 3, there is illustrated a schematic block diagram of the software driver used to implement processor partitioning. As shown, the software driver 310 for implementing processor partitioning consists of three components: a driver component 312, a target component 314, and common components 316. The driver component 312 runs under the context of the processors controlled by the operating system. The target component 314 executes under the context of the target processors, which are not under the control of the operating system but are loaded with application-specific code. The common components 316 consist of iopXX( ) entrypoints 318 that can be called by the driver component 312 and the target component 314.

In a typical multiprocessor system, when the multiprocessor system is turned on, the boot sequence includes loading the operating system into the memory of the processors and beginning execution of the I/O manager. The I/O manager determines the device drivers to be loaded and loads the appropriate device drivers into the memory of the next available processor, hereinafter called the "current processor." Typically, the device drivers to be loaded are read from the system registry.

Figure 4:
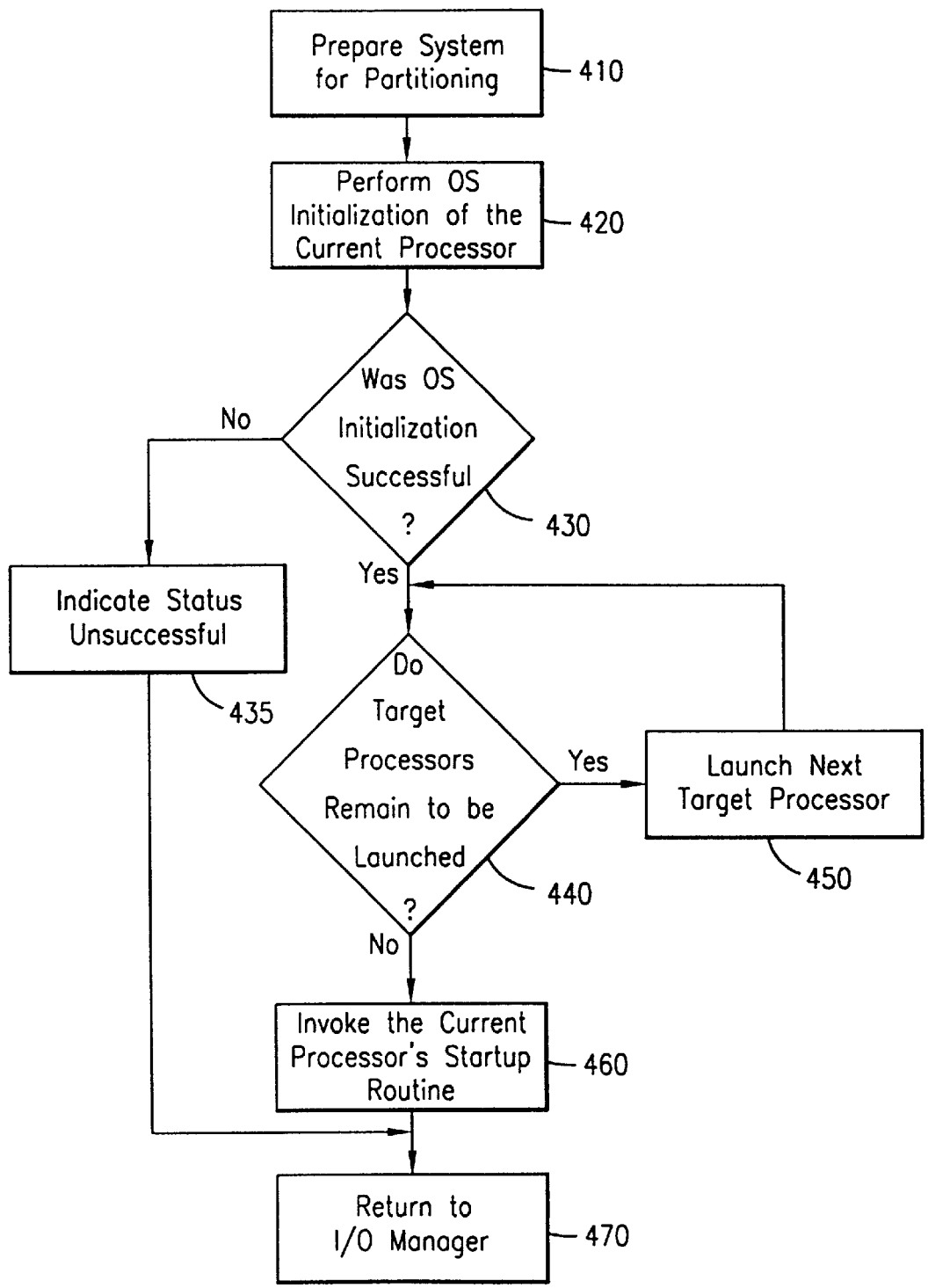
FIG. 4 is a block flow diagram of the steps performed by the software driver to partition processors.

FIG. 4 is a block flow diagram illustrating the partitioning of processors in accordance with the principles of the present invention. In step 410 the system is prepared for partitioning processors. This preparation includes installing the driver program for partitioning processors, initializing the system with the number of processors to be used for the operating system (so that the remaining processors may be allocated as target processors), and specifying the driver program as one of the device drivers to be loaded. When the system is booted and loads the driver program, the driver determines the number of processors that will be used by the operating system. The remaining processors will launched as target processors during the partitioning process.

Still referring to FIG. 4, step 420 performs initialization necessary for the current processor to function as a normal operating system processor yet communicate with the processors that are not under the control of the operating system. This initialization includes allocating system-specific data structures and preparing the CPU information data area.

In step 430 the system determines whether the operating system initialization of the current processor was successful. If the determination was made that the operating system initialization was not successful, the 'no' branch is followed to step 435. The system sets an unsuccessful status in step 435, and then control is returned to the I/O manager 214 in step 470.

If in step 430 the system determines that the operating system initialization was successful, the system follows the 'yes' branch and proceeds through steps 440 through 460. In step 440, the system determines whether any target processors remain to be launched. If the system determines that target processors remain to be launched, the system follows the 'yes' branch and the next target processor is launched in step 450. If the system determines in step 440 that no target CPUs remain to be launched, the system follows the 'no' branch to step 460. In step 460 the current processor's startup routine is invoked.

Finally, still referring to FIG. 4, in step 470, the current processor and all target processors have been initialized and started to perform their respective system and non-system functions, and control is returned to the I/O manager.

Figure 5:
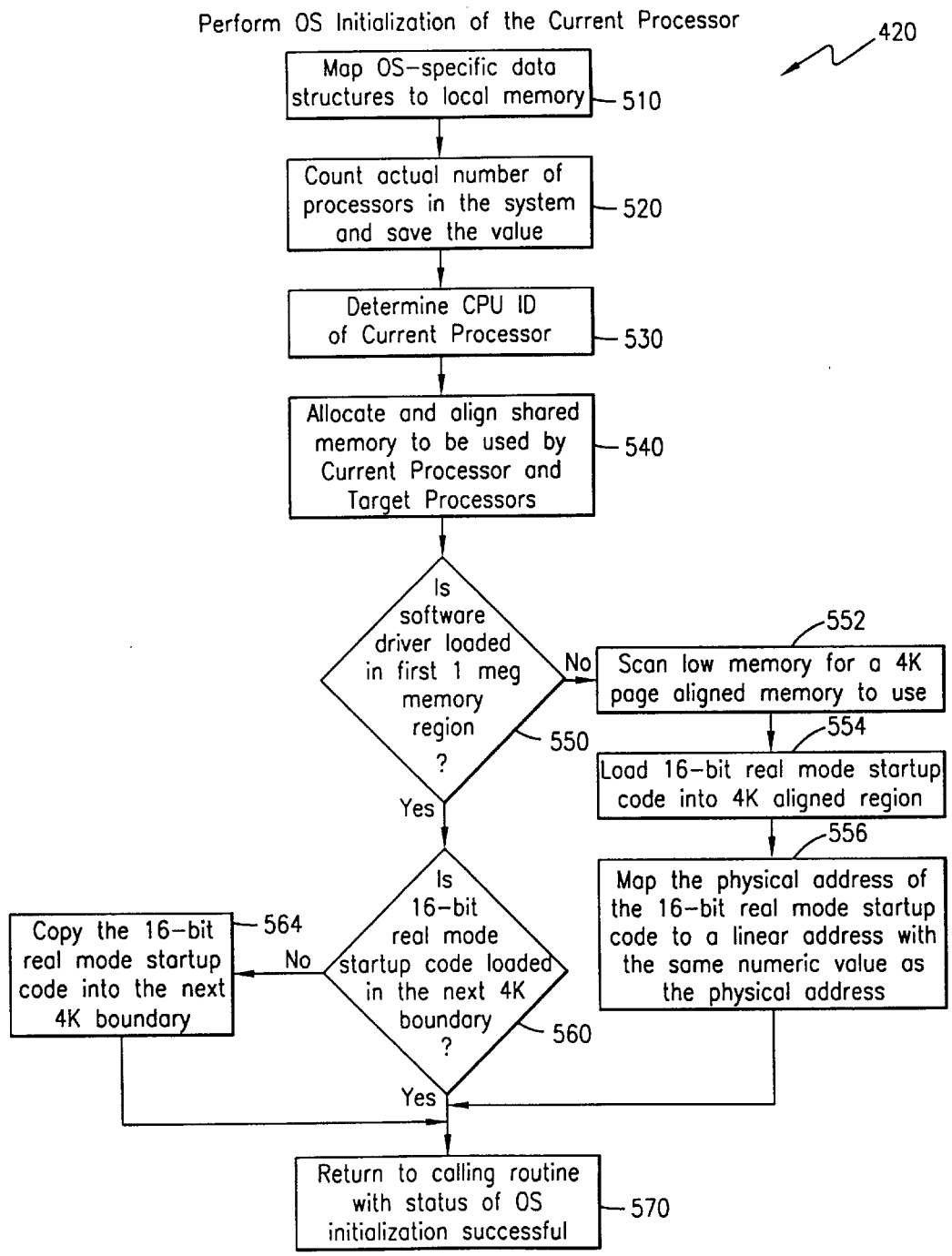
FIG. 5 is a block flow diagram illustrating the initialization of a processor to perform operating system functions (as referenced in Step 420 of FIG. 4)

FIG. 5 is a block flow diagram illustrating the initialization of a processor to perform operating system functions (as referenced in Step 420 of FIG. 4). In step 510, the system establishes system-specific mappings to local memory (such as physical location 0x00000000). In step 520, the system counts the number of actual processors in the multiprocessor system and saves the value. In step 530, the CPU identification number of the current processor is determined. In step 540, shared memory that will be used by both the current processor and the target processors is allocated and aligned.

Still referring to FIG. 5, step 550 determines whether the software driver is located within the first one megabyte memory region. If the software driver is located within the first one megabyte memory region, the 'yes' branch is followed to step 560. Step 560 determines whether the driver component of the 16-bit real mode startup code is loaded in the next 4K boundary. If in Step 560 the system determines that the driver component of the 16-bit real mode startup code is loaded in the next 4K boundary, the 'yes' branch is followed to step 570. Control is returned to the calling routine in step 570 because the 16-bit real mode startup code is properly located for starting the current processor.

Referring again to step 560 of FIG. 5, if the system determines that the 16-bit real mode startup code is not loaded in the next 4K boundary, the 'no' branch is followed to step 564. In step 564 the 16-bit real mode startup code is copied into the next 4K boundary. The system then proceeds to step 570. Control is returned to the calling routine in step 570 because the 16-bit real mode startup code is properly located for starting the current processor.

Referring again to step 550 of FIG. 5, if the system determines that the software driver is not loaded into the first one megabyte memory region, the 'no' branch is followed to step 552. In step 552 the system scans low memory (such as physical location 0x00000000 to 0x00100000 for a 4K page aligned region to use to load the 16-bit real mode startup code. When a 4K page aligned region is found, the 16-bit real mode startup code is loaded in step 554. In step 556, the physical address of the 16-bit real mode startup code is mapped to a linear address with the same numeric value as the physical address. This 1:1 (also known as tiled) mapping ensures that the 16-bit startup code can still continue code execution after placing the processor into protect mode with paging enabled. Control then returns to the calling routine in step 570 with a status that the operating system initialization was successful so that target processors may be launched.

Figure 6:
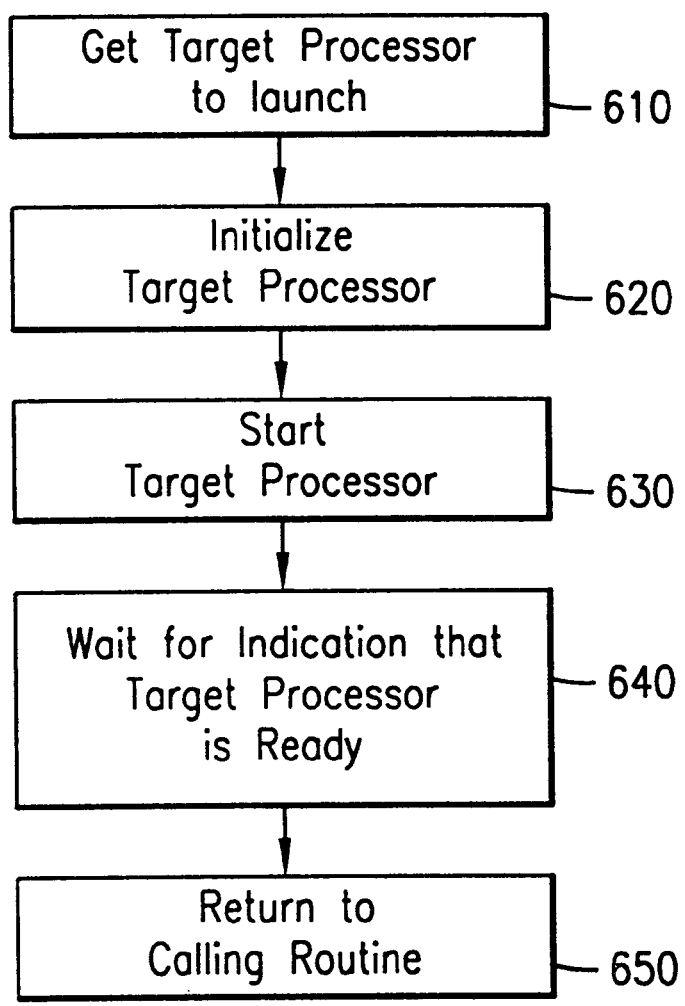
FIG. 6 is a block flow diagram illustrating the launching of a target processor (as referenced in Step 450 of FIG. 4)

FIG. 6 is a block flow diagram illustrating the launching of a target processor (as referenced in Step 450 of FIG. 4). In step 610, the system searches for a target processor to launch. If a target processor is found, the target processor is initialized to perform under an application-specific context rather than under the control of the operating system as indicated by step 620. In step 630, the system starts the target processor in accordance with the rules for the particular operating system and hardware environment. In step 640, the system waits for the target IOP to come out of initialization and indicate that it is ready. In step 650, control returns to the calling routine.

Figure 7:
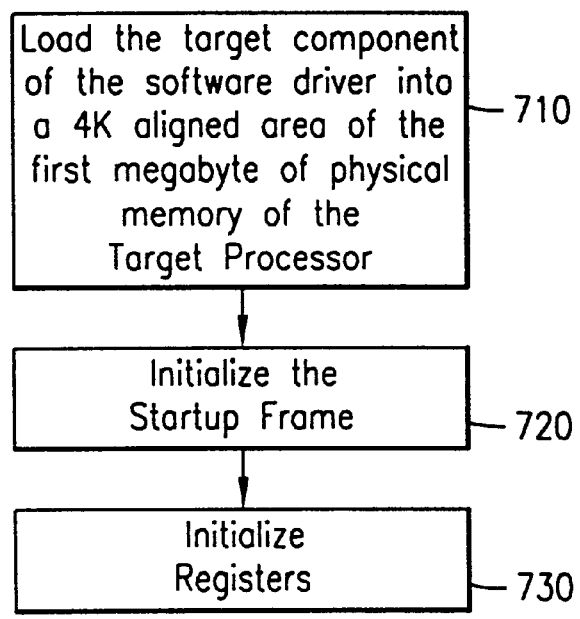
FIG. 7 is a block flow diagram illustrating the initialization of a target processor (as referenced in Step 620 of FIG. 6).

FIG. 7 is a block flow diagram illustrating the initialization of a target processor (as referenced in step 620 of FIG. 6). The initialization includes loading the target component of the software driver into a 4K aligned area of the first megabyte of physical memory of the target processor, as shown in step 710. In addition, the startup frame is initialized in step 720, and the control, general purpose, and other registers for the target processor are initialized in step 730.

Although the present invention has been described as partitioning host processors to perform as an IOP in an I$_2$O compliant system, it is contemplated that the present invention is not limited to such. Rather, it is contemplated that the processors may be partitioned to perform any type of computer functions.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer system comprising:

a plurality of processors;

an operating system; and a partitioning module for initializing a first processor of the plurality of processors to perform a first set of functions under control of the operating system, and further for initializing at least a second processor of the plurality of processors to perform a second set of functions under control of application-specific code and not under control of the operating system.

2. The computer system as recited in claim 1, wherein the partitioning module comprises a software driver loadable into a memory associated with the plurality of processors upon start-up of the computer system, the software driver comprising the application-specific code.

3. The computer system as recited in claim 2, wherein the software driver comprises:

a driver component executable under a context of the first processor; and a target component executable under a context of the second processor.

4. The computer system as recited in claim 1, wherein the first set of functions comprises performing operating system functions and communicating with the second processor.

5. The computer system as recited in claim 1, wherein the second set of functions comprises serving as an Input/Output Processor (IOP).

6. In a computer system having a plurality of processors, an operating system, and a memory coupled to the plurality of processors, a method for partitioning the plurality of processors, the method comprising the acts of:

identifying a selected first number of the plurality of processors to perform a first set of functions under control of the operating system;

identifying a selected second number of the plurality of processors to be allocated to perform a second set of functions under control of application-specific code and not under control of the operating system, each of the selected second number of processors being a target processor;

initializing a first processor of the selected first number of the plurality of processors to perform the first set of functions; and initializing each target processor to perform the second set of functions.

7. The method as recited in claim 6, comprising loading a software driver into the memory, the software driver being configured to identify the selected first number of the plurality of processors and to identify the selected second number of the plurality of processors which are target processors.

8. The method as recited in claim 7, wherein the software driver comprises a driver component configured to execute under a context of at least the first processor and a target component configured to execute under a context of at least a first target processor.

9. The method as recited in claim 8, wherein the step of initializing the first processor to perform the first set of functions comprises loading the driver component of the software driver into a region of the memory associated with the first processor.

10. The method as recited in claim 8, wherein the act of initializing each target processor comprises loading the target component of the software driver into a region of the memory associated with each target processor.

11. The method as recited in claim 6, comprising the act of determining whether the initialization of the first processor was successful, such that if the determination is made that the initialization was successful, determining whether a target processor remains to be initialized, such that if the determination is made that at least one target processor remains to be initialized, initializing the remaining target processors.

12. The method as recited in claim 6, wherein the first set of functions comprises performing operating system functions and communicating with each target processor.

13. The method as recited in claim 6, wherein the second set of functions comprises serving as an Input/Output Processor (IOP).

14. The method as recited in claim 6, wherein the selected first number is one.

15. The method as recited in claim 6, wherein the selected second number is one.

16. In a computer system having a plurality of processors, a method for partitioning the plurality of processors, said method comprising the steps of:

identifying a selected number of the plurality of processors to perform a first set of functions;

identifying a selected number of the plurality of processors to be allocated to perform a second set of functions, each of the identified processors to be allocated to perform a second set of functions being a target processor;

initializing a first processor of the selected number of the plurality of processors identified in said step of identifying a selected number of the plurality of processors to perform a first set of functions, said step of initialization including the steps of;

mapping system-specific data structures to local memory associated with said first processor;

allocating and aligning shared memory to be used by said first processor and each target processor; and loading a driver component of a software driver into a memory region of said first processor;

initializing each target processor, said step of initialization of said target processor including the step of loading a target component of a software driver into a memory region of said target processor; and launching each target processor, said step of launching each target processor further including the steps of:

starting said target processor; and waiting for said target processor to indicate that it is ready.

17. The method as recited in claim 16, wherein said first set of functions comprises performing operating system functions and communicating with each target processor.

18. The method as recited in claim 16, wherein said second set of functions comprises serving as an Input/Output Processor (IOP).

\* \* \* \* \*